United States Patent [19]

Wuertz

[11] 4,433,204
[45] Feb. 21, 1984

[54] JUNCTION BOX FOR POKE-THRU FLOOR FITTINGS

[75] Inventor: Emil S. Wuertz, Madison, Conn.

[73] Assignee: Harvey Hubbell Incorporated, Orange, Conn.

[21] Appl. No.: 406,177

[22] Filed: Aug. 9, 1982

[51] Int. Cl.³ ............................................. H02G 3/08
[52] U.S. Cl. ...................................... 174/48; 174/53; 220/3.94
[58] Field of Search ............... 174/48, 49, 53; 52/221; 220/3.92, 3.94

[56] References Cited

U.S. PATENT DOCUMENTS

| | | | |
|---|---|---|---|
| 1,920,811 | 8/1933 | Schwabacher | 174/53 |
| 3,371,149 | 2/1968 | Maxted | 174/53 |
| 3,472,945 | 10/1969 | Trachtenberg | 174/53 |
| 4,323,724 | 4/1982 | Shine | 174/48 |

Primary Examiner—A. C. Prescott
Assistant Examiner—D. A. Tone
Attorney, Agent, or Firm—Jerry M. Presson

[57] ABSTRACT

Disclosed is a junction box for a poke-thru floor wherein access to both the communications and power service compartments can be had from the same side of the junction box. Additionally, the telephone service installer does not have to disturb the power wires to make a telephone service connection or to remove the closure plug for the telephone compartment.

11 Claims, 4 Drawing Figures

JUNCTION BOX FOR POKE-THRU FLOOR FITTINGS

This invention relates to electrical fittings which are insertable through an opening in a floor structure for providing electrical power and electrical communication services between the lower and upper surfaces of the floor.

BACKGROUND OF THE INVENTION

Electrical floor fittings which are insertable through a floor opening for providing both electrical power service and telephone service between opposite surfaces of the floor are commonly referred to by those working in the art as "poke-thru" floor fittings because they are vertically insertable through the opening. Such fittings typically mount a floor box head at one end thereof which rests on the upper floor surface and an electrical junction box at the opposite end thereof adjacent the lower surface of the floor. Electrical conductors appropriate for each type of service pass through the fitting and hard wire or plug-in connections are made to these conductors at the floor and junction boxes, respectively. The fittings are attached fixedly to the floor, either by clamping devices attached to the fittings which engage the under floor surface or by devices which can be displaced outwardly to grip the wall defining the floor opening.

In order to facilitate the installation of these fittings in floor openings from the upper floor surface, the junction box of the fitting may be made sufficiently narrow to pass vertically down through the opening. A prior art junction box of this particular type is disclosed generally in U.S. Pat. No. 4,323,724 and an enlarged, full sectional side view of a typical embodiment of this prior art type of junction box and an adjoining fitting tube or conduit is illustrated in FIG. 1 of the instant application to facilitate an understanding of the construction of this type of junction box.

With reference to FIG. 1 hereof, the prior art junction box 10 is made of a fire-resistant metal, such as steel, and is fixedly attached by, for example, welding to the lower end of a vertically-disposed, hollow metal tube or conduit 11. A longitudinal divider plate 12 partitions the tube 11 longitudinally into respective electrical power and communications service compartments.

The junction box 10 is elongated and narrow enough to pass freely through the floor opening through which the telephone and power conductors must pass. A portion of the tube 11 which is in the floor opening may mount a horizontal plate or other means which supports fire and smoke barriers for preventing the passage of fire and smoke through the fixture and the floor opening. The fire barriers are typically composed of a stack of horizontally disposed intumescent discs or plates which expand horizontally and vertically when subjected to high temperatures, as encountered in a fire situation, to block off open spaces between the fitting and the internal wall of the opening.

The junction box 10 may be of overall rectangular shape for facilitating its endwise insertion through the floor opening from the upper floor surface. A flat front cover plate 14 on the box 10 is fixedly attached to the conduit 11 and has a generally L cross-sectional shape. A rear cover plate 16, which is also typically flat, is removably attached at its lower end to the rearwardly extending leg 14A of the front cover 14 by a machine screw 18. At its upper end, the plate 16 is removably attached to the tube 11 by a machine screw 19. A divider plate 21, also composed of a fire-resistant metal such as steel, partitions the junction box 10 into a telephone service compartment 30 and an electrical power service compartment 31; the lower end of the divider plate 21 being removably attached to the inside surface of the front cover 14 by a machine screw 22. The upper end of the plate 21 abuts one side of a divider plate 12 which passes upwardly through the tube 11 so as to complete the partitioning of the conduit and junction box longitudinally into two partitioned service compartments which respectively communicate with the telephone service compartment 30 and the power service compartment 31 in the junction box 10.

The electrical wires and associated connectors required for each type of service are conventional and are ommitted for purposes of clarity.

A conventional cylindrical knock-out plug 32 is located slightly rearwardly of the front face of the cover 14 and is circumscribed by a circular, partially cut through opening 32A through which the telephone wires can pass once the plug 32 is knocked rearwardly into the compartment 30 by the telephone installer. Frontal access to the telephone service compartment 30 is therefore only available through the opening 32A. Access to the power service compartment 31 can be gained by removing the rear cover plate 16 after unscrewing and removing both mounting screws 18 and 19. Conventional cylindrical knock-out plugs 33 are formed in the plate 16 and cover partially cut-through openings through which the cord end containing the electrical power wires may be inserted once one of the plugs 33 is knocked out.

To hard-wire the fitting of FIG. 1, commencing with the power conductors, typically one of the knock-out plugs 33 is first punched into the power service compartment 31 by an electrician who thereafter detaches the back cover plate 16 to gain access to the power service compartment 31 by removing mounting screws 18 and 19. One end of the insulated electrical cord containing the power conductors is then inserted through the knock-out opening in the plate 16 into the compartment 31 where electrical connections are made to the lower terminal ends of power wires which hang loosely in the tube 11. The upper ends of such conductors are also connected to appropriate terminals on wiring devices, such as receptacles, mounted in the fitting head (not shown) on the upper floor surface. Once connections to the power conductors are made, as by wire nuts, the back plate 16 is reattached to the front cover 14 by reinserting and turning the screws 18 and 19.

Assuming that telephone service installation is also desired, typically, a telephone service installer will knock the slightly rearwardly positioned plug 32 into the compartment 30 to open up the front cover plate for the insertion of a telephone cord into the compartment 30 through the opening 32A left by the plug 32. The plug 32 should be removed from the telephone compartment because it is in a position to interfere with the making of the telephone connections. Inasmuch as the telephone conduit opening 32A is too small to permit its easy withdrawal through that same opening, the telephone installer will usually resort to removing the back cover 16 by removing the screws 18 and 19 and then the divider plate 21, which normally blocks rearward access to the telephone compartment 30 by unscrewing the screw 22. However, if the telephone installer follows the electrician in wiring sequence, as is typically the case in these types of hybrid communication/power service installations, the power service compartment 31 will already be occupied by the power cord. Thus, the telephone installer is faced with a relatively difficult and possibly even dangerous job of having to manipulate the divider plate 21 and the loose telephone knock-out plug 32 past the connected power conductors in the compartment 31. This needs to be done carefully so as not to disrupt any of the electrical connections previously made in the power service compartment 31 and hence, the whole procedure is time-consuming.

To summarize, with this prior art junction box, if access to the telephone compartment 30 is desired through other than the relatively small opening 32A in the front cover, it must be made through the power service compartment. Moreover, this arrangement requires the telephone installer remove oppositely positioned covers on the box and access oppositely facing compartments which is time-consuming and inefficient.

BRIEF DESCRIPTION OF THE PRESENT INVENTION

In accordance with the present invention, there is provided a new and improved junction box for a poke-thru floor fitting wherein access to both the communications and power service compartments can be had from the same side of the junction box. Additionally, the telephone service installer does not have to disturb the power wires to make a telephone service connection or to remove the knock-out plug in the telephone compartment. Specifically, this is accomplished by joining the telephone/power service divider plate and the power service cover plate as a unitary structure which is selectively removable from the front side of the junction box and by having the plate covering the telephone service compartment selectively removable from the same frontal side of the junction box as the power service cover plate. With both cover plates removed from the box, access is available to the interior of the power service compartment from the front of the junction box. With the power service cover plate restored, frontal access to the interior of the telephone service compartment is obtainable. In the latter mode, the power service compartment is isolated from the telephone service compartment by the intervening divider plate.

OBJECTS OF THE INVENTION

It is an object of this invention to provide a new and improved junction box for use in poke-thru type floor fittings for facilitating the making of communications and power service connections to various electrical conductors in the fitting.

Another object of this invention is a new and improved junction box for use in poke-thru type floor fittings, wherein both the power service and the telephone service compartments are accessible from the same side of the junction box.

Still another object of this invention is to provide a junction box for poke-thru floor fittings having a telephone service and power service compartments, wherein the telephone service compartment can be completely accessed without disturbing electrical conductors or cords in the power service compartment.

Yet another object of this invention is to provide a new and improved junction box which is adaptable to and may be used on a variety of conventional poke-thru type floor fittings as a replacement for conventional junction boxes.

DETAILED DESCRIPTION OF THE INVENTION

Figure 1:
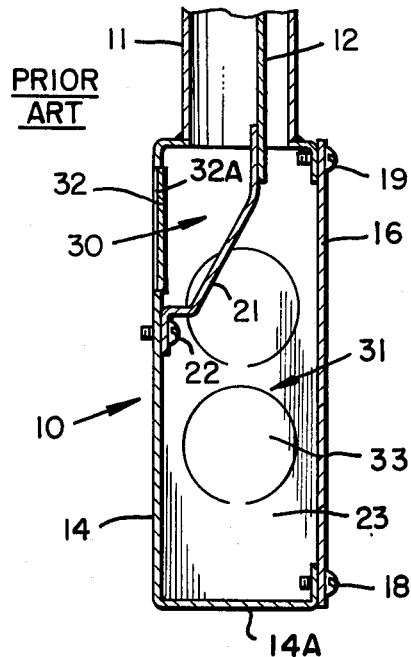
FIG. 1 is a full sectional side view of the aforedescribed prior art junction box.
Figure 2:
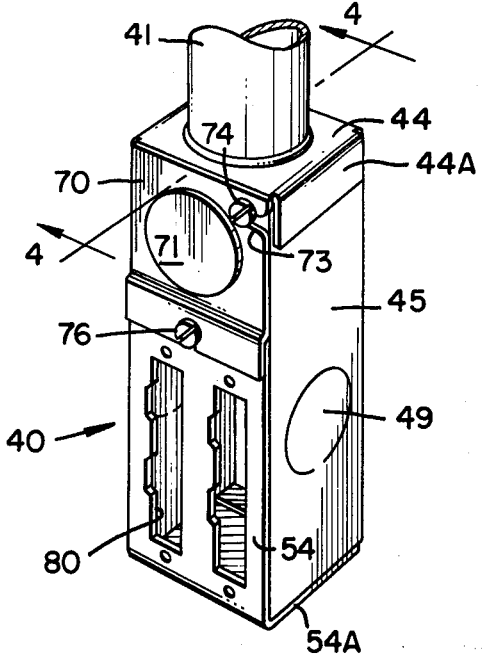
FIG. 2 is a perspective view of the fully assembled junction box of the present invention and a portion of an adjoining conduit fitting as viewed from the front side thereof.
Figure 3:
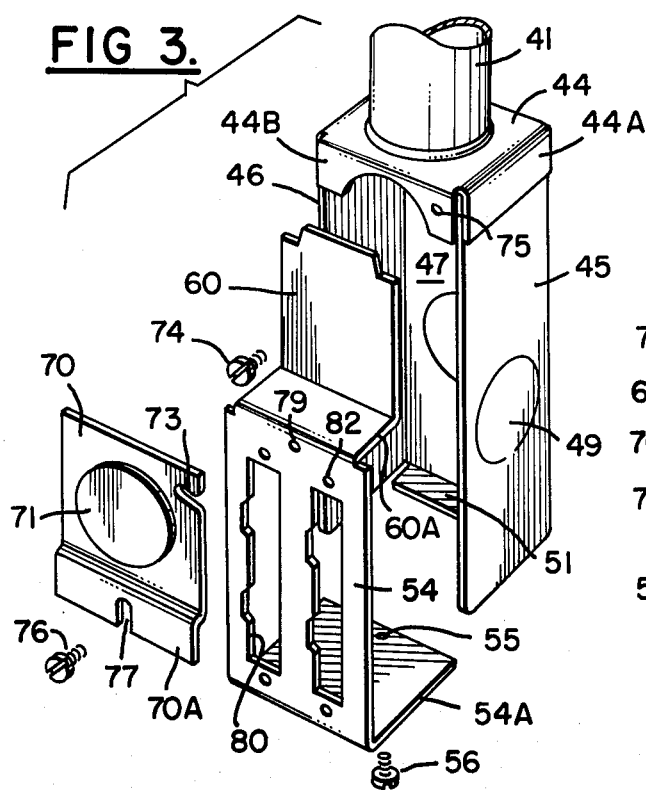
FIG. 3 is an exploded perspective view illustrating the disassembled components comprising the junction box of the present invention.
Figure 4:
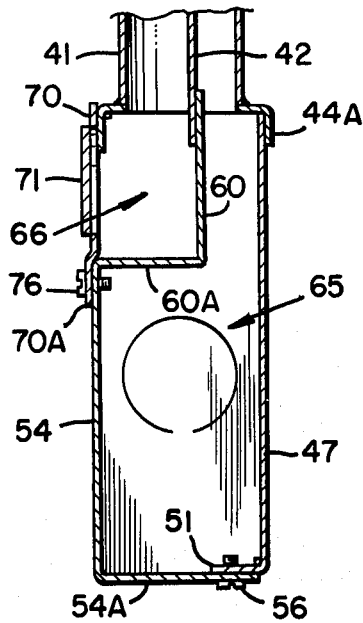
FIG. 4 is a full sectional side view of a junction box constructed in accordance with this invention and a portion of an adjoining conduit fitting.

Having now described briefly a prior art junction box 10 illustrated in FIG. 1, the junction box of the present invention is referred to by the numeral 40. The junction box 40 is generally of overall rectangular shape and the longitudinal (or vertical) cross-sectional dimensions of the junction box 40 and hollow tube 41 attached thereto may also be made small enough to pass vertically downwardly through the opening cut in the floor. A box top is fixedly attached by any suitable means to the lower end of a hollow tube 41 which forms that lower end of the fitting for housing the telephone and power conductor wires. The tube 41 typically is of a circular or rectangular cross-section and the top 44 is apertured to the outer peripheral surface of the tube so that the tube fits inside the top aperture and attached to the top by, for example, the tube/slot arrangement disclosed in U.S. Pat. No. 4,336,416 assigned to the same assignee as the instant invention. The top 44 includes three unitary, depending side tabs 44A and a front tab 44B. Side plates 45, 46 and rear plate 47 may be formed by bending a single, rigid metal rectangular plate into three portions 45, 46 and 47 of substantially equal size, each bend being a right angle bend. The upper ends of the rigid, three-sided enclosure formed by the side plates 45, 46 and rear plate 47 are inserted under the tabs 44A and are fixedly secured thereto by welding or fasteners. Each of the plates 45, 46 and 47 may be provided with one or more circular knock-outs 49, which when punched out of its associated plate, leaves a circular opening through which an electrical power cord end can be inserted. The rear plate 47, FIGS. 3 and 4, is provided with a forwardly extending flange 51 having a threaded hole into which a mounting screw 56 can be threadedly secured. The resulting box 40 is narrow enough for downward insertion through the floor opening.

Whereas the plates 45, 46 and 47 are integral, a cover 54 is removably mounted on the front of the box 40 and forms a lower front cover for the box 40. The cover 54 comprises a vertical frontal portion of the same width as the rear plate 47 so as to span the entire width of the box 40 and includes a rearwardly extending leg 54A at substantially a right angle to the vertical frontal portion. The leg 54A overlaps the flange 51 and has a through-hole 55 in its overlapping end for receiving the screw 56. The cover 54 is removably affixed to the bottom end of the box 40 by screw 56 passing freely through the hole 55 and threading into an aligned threaded hole in the flange 51 (FIG. 4).

To partition the telephone and power service compartments, there is provided a divider plate 60 which is also of substantially L cross-section. The width of the divider 60 is slightly less than the horizontal spacing between the opposite side plates 45 and 46 so that the divider can be inserted between the plates 45 and 46. The shorter leg 60A of the L is joined to the upper end of the cover 54 and depends therefrom at an angle of about ninety degrees to the longitudinal axis of the junction box. As best seen in FIG. 4, the upper end of the divider 60 extends substantially parallel to the longitudinal axis of the box and at its uppermost end, contacts the flat, rearward surface of the lower end of the divider 42, to provide a continuous fire-resistant longitudinal partition of the box 40 and the tube 41. The overlapping engagement which occurs between the upper end of the divider plate 60 and the rearward surface of the partition 42 positions and retains the upper end of the cover 54 within the box 40, and the subsequent screw attachment to the flange 51 completes the attachment of the cover 54 and the divider 42 in the box 40. Preferably, the cover 54 and the divider 60 are readily formed by stamping out a single piece of sheet metal to the desired planar shape and then bending to obtain the described cross-sectional shape for the unitary cover-divider structure.

The divider 60 separates the junction box into an enclosed power service compartment 65, FIG. 4, and an enclosed frontal communications (or telephone) compartment 66. Frontal access to the interior of the power service compartment 65 is possible by merely removing the lower cover 54 from the frontal side of the junction box. The bottom of the box 40 is also removed simultaneously with the removal of this cover to provide access to this end of the box as well.

The telephone service compartment 66 is defined by the divider 60 and by a removable upper cover plate 70 which is also provided with a forwardly positioned closure plug 71 which can be removed by inserting a screwdriver blade under one edge thereof to provide entry for the communications or telephone cables. The telephone service cover 70 has a lateral, open-ended slot 73 formed in the upper cover thereof for passing under the head of a machine screw 74 threadedly attached to the tab 44B in a threaded hole 75. The lower end of the cover 70 is formed with an upwardly extending, open-ended slot 77 to accommodate the threaded end of a machine screw 76. As is the case with the screw 74, the head of the screw 76 is larger than the slot 77 and can bear against the surface of the cover 70 surrounding the slot. The screw 76 is threaded into a threaded hole 79 tapped into the upper end of the cover 54 centrally thereof. Lower edge 70A of the upper cover 70 is bent slightly frontwardly so as to overlap and rest against the upper end of the lower cover 54 to ensure continuity of enclosure. By merely loosening the two screws 74 and 76 sufficiently to slide the upper cover 70 parallel to the front cover and out from under the screw heads, the cover 70 can be readily removed from the front of the box to gain access to the telephone compartment 66. With the cover 70 retained in position by the screw 74, by loosening the lower screw 76 between the two covers and by removing the screw 56, the lower cover 54 along with the divider 60 can be pulled down and away from the three enclosing plates 45, 46 and 47 and removed from the box 40.

As will be apparent, the instant invention permits access to each compartment 65 and 66 from one (and the same) side of the box 40. Hence, assuming the power service connections are made first, the electrician can remove the cover 54 and thereby gain access to the power service compartment 65 to make the necessary electrical connections to the power cord inserted through one of the power service openings. The cover 54 and its attached divider 60 can then be reattached to the box thereby reestablishing a power service compartment 65 and a telephone service compartment 66. Assuming that telephone connections are also to be made in the fitting, the telephone installer can remove the closure plug 71 mounted on the box 40 to provide an entry opening for the end of the telephone cord and then remove the cover 70 by loosening screws 74 and 76 and rotating the cover plate slightly counterclockwise as viewed in the drawings. The end of the telephone cord is inserted into the telephone opening in the cover 70 and electrical connections may then be made to the telephone conductors which hang downwardly into the box 40. Once these electrical connections are made, it is a relatively simple matter to replace the cover 70 and secure it to the box 40 by tightening down each of the screws 74 and 76.

The lower cover 54 may be pierced as indicated by the numeral 80 to provide opening configurations which conform to the external configurations of electrical connective devices such as multicontact receptacles and/or plug connectors. Connectors of this type are disclosed in U.S. Pat. No. 4,272,689 to Crosby et al and assigned to the same assignee as the instant invention. These connectors can be mounted fixedly against the rear surface of the cover 54, for example, by connector mounting rivets (not shown) which are inserted into rivet holes formed in the cover 54 and peened over to form appropriate attachments. The connectors may be factory wired to the power conductors in the power service compartment 65 so that on-site electrical power connections can be made directly by plugging mating plugs and/or receptacles forming the electrical terminal ends of prewired electrical cord sets into the connectors mounted on the cover 54.

While one advantageous embodiment has been chosen to illustrate the invention, it will be understood by those skilled in the art that various changes and modifications can be made therein without departing from the scope of the invention as defined in the appended claims.

What is claimed is:

1. In a fitting mounted in an aperture in a floor structure having respective upper and lower floor surfaces for providing communications service and power service between the lower and upper floor surfaces including, a hollow junction box mounted on the fitting adjacent the lower floor surface, wherein the junction box comprises:

a first side wall comprised of respective upper and lower exterior covers detachably mounted on the box in adjacent relationship and a second side wall opposite said first side wall;

a divider member in said box for separating the communications service conductors from the power service conductors, said divider member extending laterally from the lower cover toward said second side wall and upwardly in said box opposite the upper cover to provide two partitioned compartments for the communications and the power service conductors, respectively.

2. The fitting according to claim 1, wherein said junction box is elongated for insertion through the floor aperture and said upper cover has an aperture formed therein to permit passage of the communications conductors into the communications compartment.

3. The fitting according to claim 2, wherein said upper and lower covers are formed of flat plates having respective upper and lower ends.

4. The fitting according to claims 2 or 3 wherein the lowermost end of said box is open with the lower cover removed from the box for accessing the power service compartment and further, wherein;

said lower cover includes a depending panel portion at the lower end thereof extending toward said second side wall for at least partially covering the lowermost end of said box when the lower cover is mounted on the box.

5. The fitting according to claim 3 wherein said divider member and said lower cover are formed as a unitary, flat plate.

6. The fitting according to claim 5 wherein the divider plate depends from the upper end of said lower cover at substantially right angles thereto.

7. The fitting according to claim 6 wherein the lower end of said upper cover overlaps said upper end of said lower cover.

8. The fitting according to claim 6 wherein the divider plate and the lower cover plate are each of substantially L cross-section, the longer leg of said lower cover plate joining the shorter leg of said divider plate adjacent the upper end of said lower cover plate.

9. The fitting according to claim 8 wherein the interior angle of the divider and lower cover plates face in opposite directions relative to the first and second side walls; and wherein the interior angle of said lower cover plate faces said second side wall.

10. The fitting according to claim 3 wherein said lower cover is apertured for allowing power service access to an electrical connector device mounted in the box and electrically connected to the power conductors.

11. The fitting according to claim 10 wherein the electrical connector device is fixedly mounted on said lower cover whereby the device is removable from the box with the removal of said lower cover.

* * * * *